United States Patent [19]

Lehmann

[11] Patent Number: 4,628,865
[45] Date of Patent: Dec. 16, 1986

[54] APPARATUS AND METHOD FOR A CONTINUOUSLY OPERATING QUAIL FEEDER

[76] Inventor: Valgene W. Lehmann, 629 W. Lee, Kingsville, Tex. 78363

[21] Appl. No.: 711,731

[22] Filed: Mar. 14, 1985

[51] Int. Cl.⁴ .............................................. A01K 39/01
[52] U.S. Cl. ................................. 119/51 R; 119/52 R
[58] Field of Search ................... 119/52 R, 53.5, 51 R

[56] References Cited

U.S. PATENT DOCUMENTS

| | | | |
|---|---|---|---|
| 1,167,385 | 1/1916 | Clough | 119/53.5 |
| 2,896,575 | 7/1959 | Scruggs | 119/52 R |
| 4,144,842 | 3/1979 | Schlising | 119/52 R |
| 4,476,811 | 10/1984 | Swartzendruber | 119/52 AF |

Primary Examiner—Hugh R. Chamblee
Attorney, Agent, or Firm—Vaden, Eickenroht, Thompson & Boulware

[57] ABSTRACT

A device for continuously feeding quail at graduated levels above the ground. Feed is made available from an adjustable opening in a feed bin situated over a ledge, which ledge serves to allow a quail to stand by the opening to eat. A flange above the ledge around the feed opening permits quail to reach the feed but prohibits larger animals from reaching the feed. By utilizing means to adjust the elevation of the ledge from the ground, the ledge may be progressively elevated until it is high enough to prevent rodents and other small crawling animals from reaching the feed while quail, now aware of the feed, fly to the ledge and feed.

6 Claims, 5 Drawing Figures

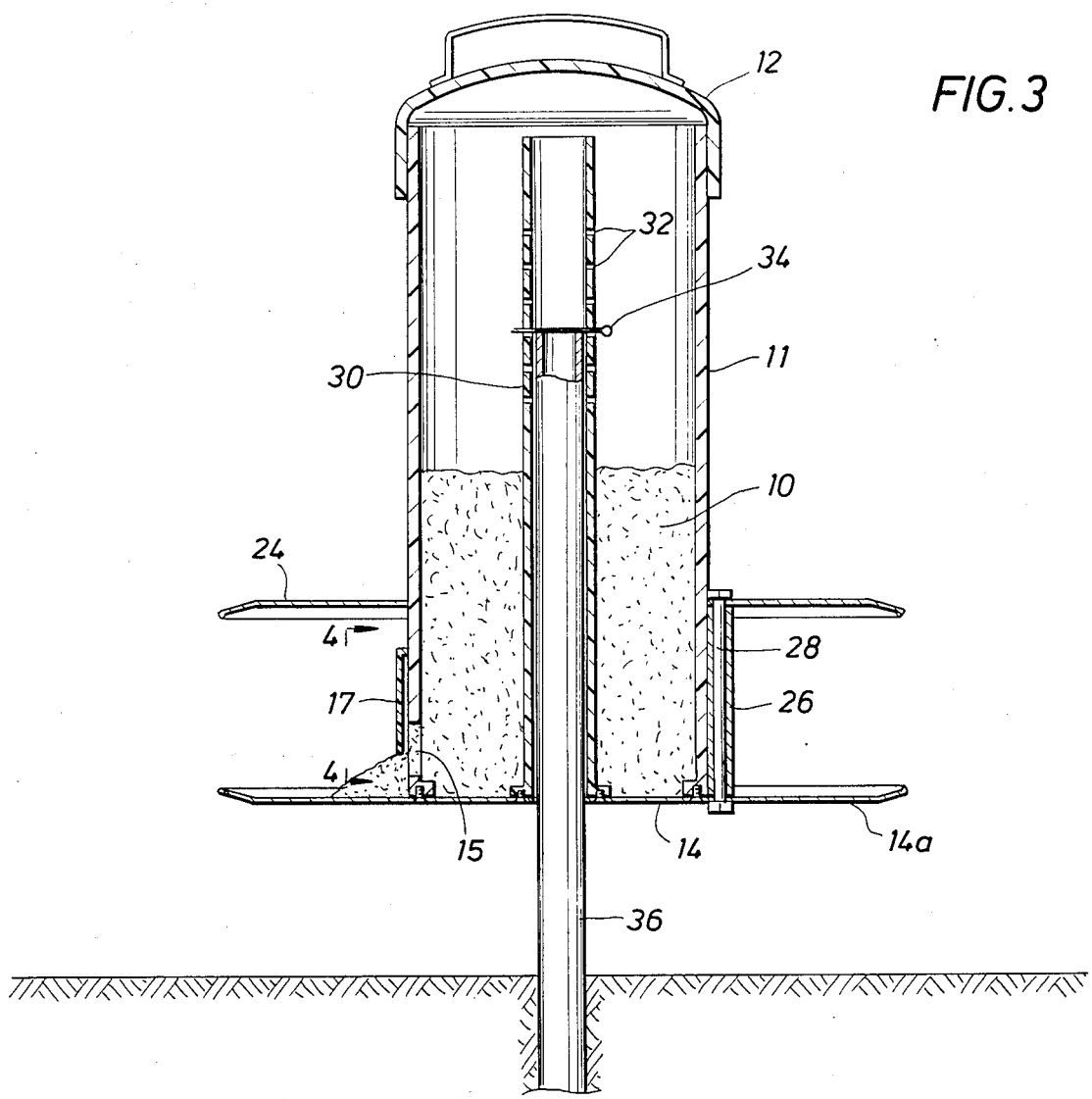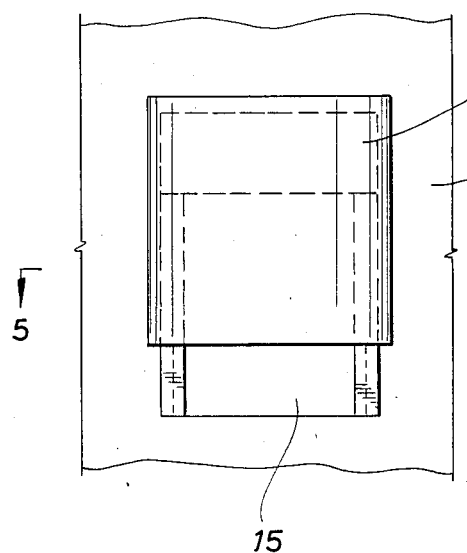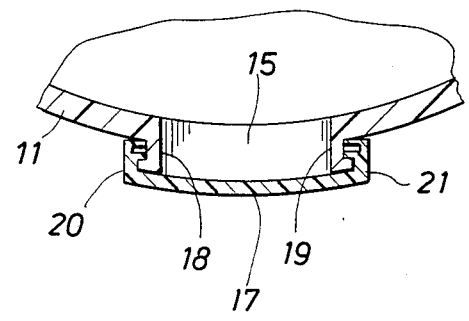

APPARATUS AND METHOD FOR A CONTINUOUSLY OPERATING QUAIL FEEDER

FIELD OF THE INVENTION

This invention relates to quail feeders. More particularly, this invention relates to apparatus that continuously offers feed to quail at levels near the ground while discouraging use by principal competitors and to a method for operating the same.

BACKGROUND OF THE INVENTION

At present commonly used feeding methods for quail involve either manually spreading the feed on the ground, mechanically spraying feed from a bin with a rotating impeller, or offering feed at ground level from a gravity type container. All three methods result in the loss of feed to animals other than quail.

Manually spreading feed on the ground is labor intensive and wasteful. The feed so spread is available to animals other than quail and is liable to contamination and spoilage.

Mechanical spray feeders scatter feed on small plots of ground at specified time intervals using timers and energy sources such as batteries. The spray feeder also has shortcomings. Mechanical and electrical parts are subject to malfunction. The battery must be recharged or replaced periodically. Spray feeders usually are not adjustable for different size feeds. Feed is sprayed on the ground at regulated times whether target species are present or not. Spray feeding, like manual feeding, therefore, is wasteful.

Gravity feeders presently available incur excessive loss to rodents. Furthermore, repeated feeding from the same ground promotes the spread of internal parasites and disease.

Our invention is a stationary feeder that goes far toward eliminating the defects of both the spray feeders and the gravity feeders currently in use.

SUMMARY OF THE INVENTION

It is an object of this invention to materially reduce the above problems by offering a continuously operating quail feeder and method for feeding quail that allows quail to remove food directly from openings in a feed bin above the ground while preventing access to those openings by large animals, such as cattle and deer, and by small animals, such as rodents, while discouraging use by competing game birds.

It is a further object of this invention to provide a quail feeder with the feed opening spaced between a ledge and a flange so that not only are large animals like cows or deer prevented from getting their heads between the ledge and flange, but also the feed, even if dropped by a feeding quail, is protected from dampness and from ultimate contact with the contaminated ground, constituting thereby a health safeguard.

It is a further object of this invention to provide a method of operating a quail feeder by first positioning the feeder near ground level to get the quail in the habit of standing on the ledge and eating the feed and then raising the feeder far enough above the ground to be out of reach of non-flying small animals but within easy flying distance of quail.

It is a further object of this invention to so dimension the feeder to the quail size and to operate the feeder in conjunction with quail habits that the feeder's use by other birds is discouraged, which is desirable from biological as well as economic standpoints.

It is a further object of this invention to offer a continuously operating quail feeder that can be adjusted to dispense different sized feeds.

It is a further object of this invention to offer a quail feeder so anchored to a base that while the vertical height of the feeder is adjustable, the feeder will rotate around the base if pushed, thereby withstanding livestock abuse.

BRIEF DESCRIPTION OF THE DRAWINGS

FIG. 3 is a vertical sectional view taken along line 3—3 of FIG. 2.

FIG. 4 is a side view looking in the direction of arrows 4—4 of FIG. 3 showing on an enlarged scale one of the adjustable gates through which feed is dispensed.

FIG. 5 is a sectional view taken along line 5—5 of FIG. 4.

DETAILED DESCRIPTION OF THE DRAWINGS

Figure 1:
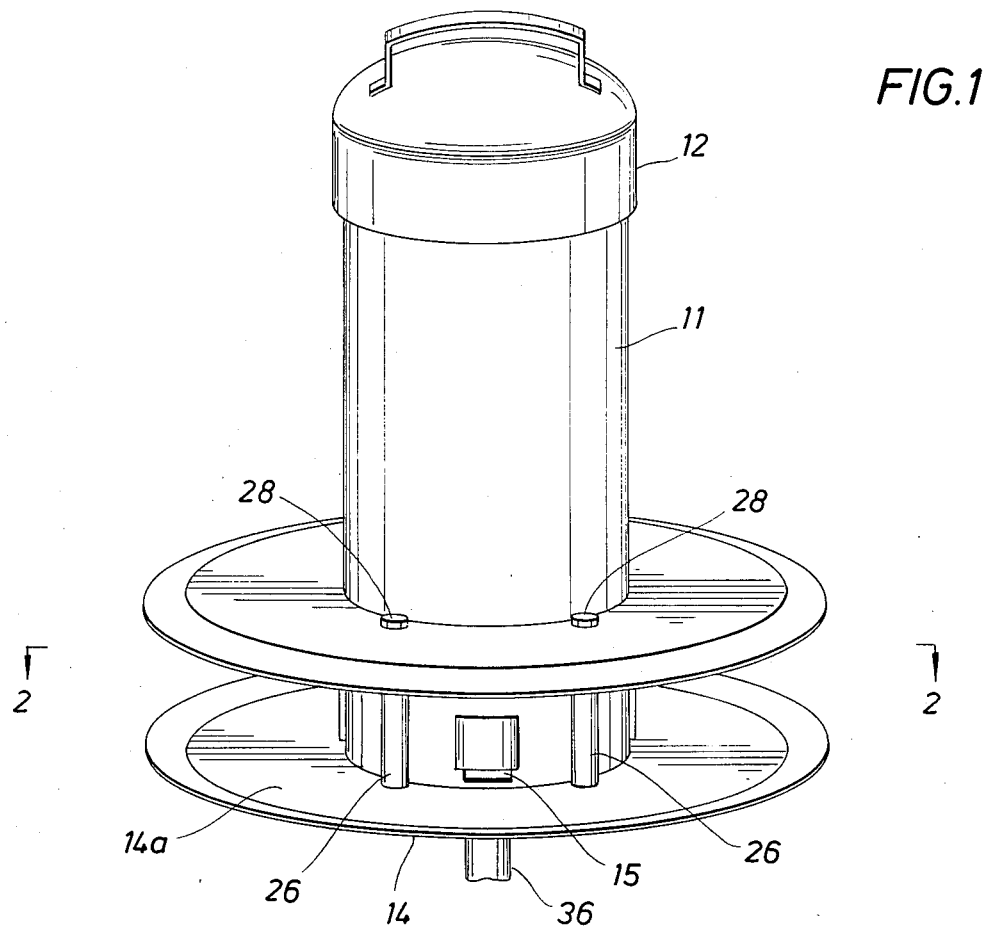
FIG. 1 is a side view in elevation of the preferred embodiment of the game bird feeder of this invention.
Figure 2:
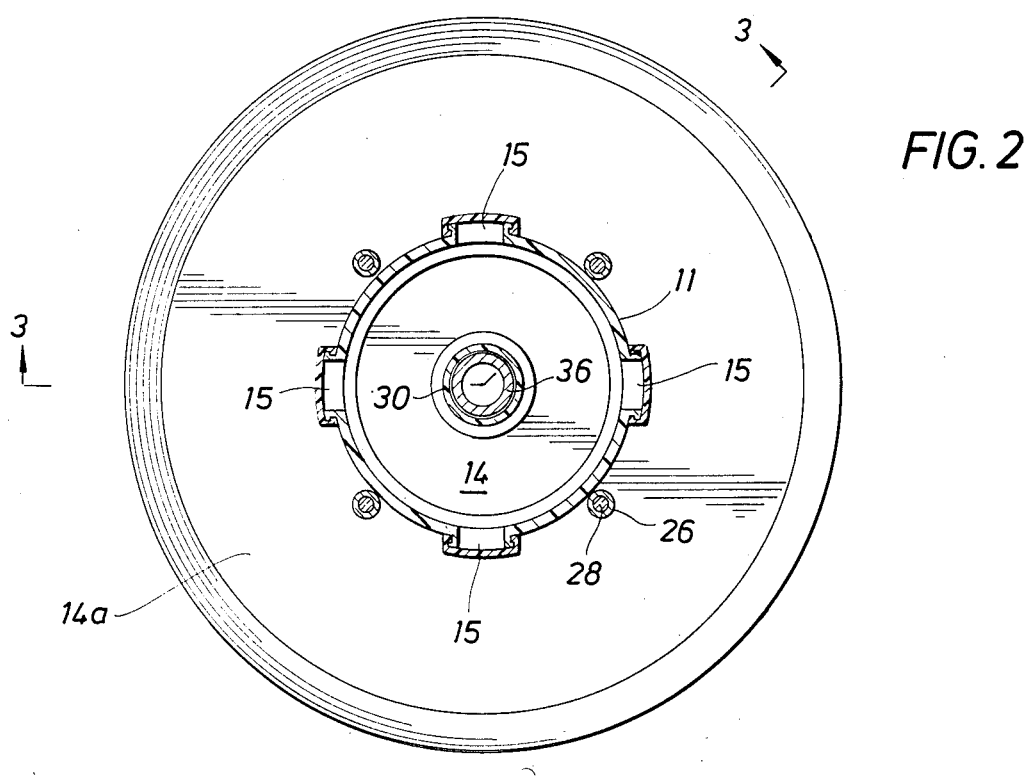
FIG. 2 is a sectional view taken along line 2—2 of FIG. 1.

Feed 10 for the quail is stored in bin 11. In the embodiment shown, the bin is cylindrical in cross-section. Cap 12 closes the top of the bin and protects the feed from rain. The lower end of the bin is closed by disc 14 that also extends outwardly beyond the bin to provide a ledge 14a. Ledge 14a should be wide enough (approx. 7 inches) to allow several quail to stand on it and remove seeds or pellets from any one of the openings in the bin. The ledge is wide enough so that feed dropped by a feeding quail will not come in contact with the often contaminated ground, thereby preventing the spread of parasites and disease by the feeder and method.

A plurality of openings 15 in the wall of the bin are located adjacent the bottom of the bin through which feed is removed by the combination of the picking action of the birds plus gravity. Four feed openings are shown. They are spaced equally around the bin.

The flow of feed through the openings is controlled by sliding gate 17. As shown in FIG. 5, parallel arms 18 and 19 extend outwardly from opposite sides of opening 15. The arms are L-shaped in cross-section and mate with L-shaped arms 20 and 21 attached to opposite sides of gate 17 and guide the gate as it moves up and down opening and closing the opening. There is enough friction between the arms to hold the gate in the desired position. Different feeds require different size openings to supply the proper amount of feed without allowing feed to accumulate on the lower disc. The position of gate 17 is adjusted accordingly.

Means are provided for preventing larger animals, such as livestock, deer, and javelina from eating the feed. In the embodiment shown, disc or flange 24 is positioned approximately 5 inches above disc 14 to provide sufficient space between the discs to allow a bird to stand on ledge 14a of disc 14 and eat the feed, but close enough to disc 14 to prevent larger animals from getting their heads or bodies far enough into the space to eat the feed. Disc 24 is held in position by tubular spacers 26 and bolts 28 that extend through the spacers and the discs.

Means are provided to support the feeder above the ground and to allow the distance the feeder is above the ground to be adjusted to a preferred height of 18 to 24 inches above ground level. Mounting sleeve 30 is attached to plate 14 and extends upwardly along the center of the bin. Equally spaced holes 32 extend along opposite sides of the sleeve through which pin 34 can extend. Sleeve 30 is lowered over anchor pipe 36, after it has been driven into the ground the desired distance, until pin 34 engages the top of the anchor pipe. The height of the feeder is adjusted by changing the holes through which pin 34 extends. By this arrangement the sleeve, although of fixed vertical height, can rotate around the base if animals push against the bin, ledge or flange, dissipating by the rotational movement the pressure created on the feeder.

The feeder is especially intended to feed quail. To habituate the quail to fly to the ledge of the feeder when it is in its desired position above the ground, the feeder is initially positioned with the ledge near the ground with the adjustable gates set open for the appropriate feed size. Over a period of days, after the quail have become accustomed to the feeder, the height of the feeder is gradually raised from the ground until crawling small animals, like rodents, cannot reach the ledge. The quail, however, by this time will know there is feed in the bin and will fly the short distance to the disc ledge to obtain it.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A continuously operating quail feeder, comprising:
    a bin for feed having an opening through which quail secure the feed;
    a ledge located under the opening to support the quail as it eats;
    means located above the ledge for preventing larger animals, such as cattle and deer, from eating the feed; and
    means for supporting the feeder above the ground, which means comprises:
        a base having a portion for extending into the ground to support the base in an upright position;
        a mounting sleeve attached to the bin and mounted on the base for vertical movement relative to the base to adjust the height of the bin above the ground;
        means to hold the sleeve from such relative vertical movement when the bin is the desired distance from the ground; and
        means for allowing the sleeve to rotate relative to the base so that pressure exerted on the bin, ledge or flange is dissipated by the rotational movement of the sleeve around the base.

2. The quail feeder of claim 1 wherein the feed opening of the bin is provided with a gate for varying the size of the opening as desired for different feeds and different feed rates.

3. The quail feeder of claim 1 in which the means for preventing large animals from eating the feed comprises:
    a flange extending outwardly from the bin and spaced above the ledge a distance sufficient to allow easy access on the ledge to the feed opening by quail but spaced close enough to the ledge to prevent larger animals from getting their heads or bodies far enough between the ledge and the flange to reach the feed.

4. The quail feeder of claim 3, in which the distance between the flange and the ledge is approximately five inches.

5. The quail feeder of claim 3, in which the flange and the ledge both extend outwardly from the bin approximately seven inches.

6. A method of feeding quail from a feeder having a horizontal ledge that supports the quail as they remove feed through an opening in the feeder, and having means located above the ledge for preventing larger animals, such as cattle and deer, from eating the feed, comprising the steps of:
    positioning the feeder with the ledge close enough to the ground such that walking quail can discover the feed in the feeder; and
    progressively raising the feeder above the ground to an eventual distance of approximately 18 to 24 inches such that quail habituated by the past availability of feed can spring to the ledge but rodents can no longer continue to reach the ledge.

* * * * *